United States Patent [19]

Buccola

[11] Patent Number: 4,537,437
[45] Date of Patent: Aug. 27, 1985

[54] NOZZLE POSITIONER FOR AUTOMATIC FUEL TANK

[76] Inventor: Anthony A. Buccola, 5550 Fieldston Rd., Bronx, N.Y. 10470

[21] Appl. No.: 547,106

[22] Filed: Oct. 31, 1983

[51] Int. Cl.³ .............................................. B60R 27/00
[52] U.S. Cl. ................................ 296/1 C; 141/311 R; 141/390; 248/75
[58] Field of Search .................... 296/1 C; 248/75, 79; 141/87, 88, 390, 391, 392, 332, 311 R

[56] References Cited

U.S. PATENT DOCUMENTS

| 3,291,165 | 12/1966 | Fraylick | 141/390 X |
| 3,992,051 | 11/1976 | Hitch | 296/1 C |
| 4,228,978 | 10/1980 | Rand | 248/75 X |
| 4,236,746 | 12/1980 | La Voie | 296/1 C |

FOREIGN PATENT DOCUMENTS 965068  5/1957  Fed. Rep. of Germany ........ 248/79

Primary Examiner—Robert B. Reeves
Assistant Examiner—Russell D. Stormer
Attorney, Agent, or Firm—Charles E. Baxley

[57] ABSTRACT

A typical embodiment of the invention provides a pair of flanges on the surface of a license plate holder that usually conceals the recess in which the fuel tank stand pipe and cap is mounted. The flanges guide the fuel pump hose nozzle into proper relationship with the stand pipe and keep the nozzle in the correct orientation as the tank is being filled with gasoline in order to protect the vehicle from being marred and to prevent gasoline spillage.

8 Claims, 1 Drawing Figure

U.S. Patent   Aug. 27, 1985   4,537,437
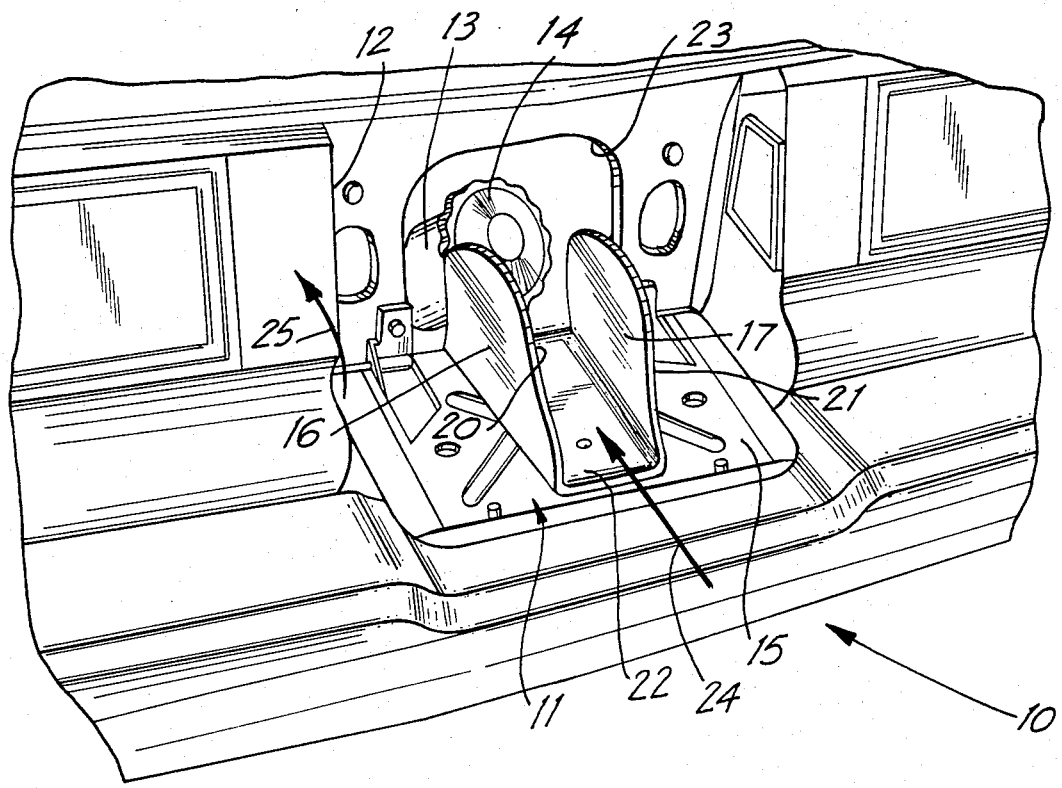

NOZZLE POSITIONER FOR AUTOMATIC FUEL TANK

FIELD OF THE INVENTION

This invention relates to automobile accessories and, more particularly, to a pair of parallel flanges that are mounted on an automobile license plate holder for supporting the nozzle on the end of a gasoline pump hose in the vehicle's fuel tank stand pipe, and the like.

BACKGROUND OF THE INVENTION

Frequently, because of a large volume of customers and a limited number of gas station attendants, automobile refueling service is often done in a hasty and inattentive manner. The attendant, striving to satisfy a number of customers' needs for gasoline, oil, coolant and the like in a brief period of time will flip the license plate holder into a horizontal position to expose the fuel tank stand pipe and its associated cap. Removing the cap with one hand and trying to swiftly insert the nozzle on the gas pump hose into the stand pipe at about the same time with the other hand occasionally causes the attendant to jam the metal nozzle into the body structure surrounding the aperture that accommodates the licence plate holder. This heavy or careless act can mar the automobile's finish and dent the body metal.

Further in this respect, if the attendant is not careful to properly insert the nozzle's discharge spout into the stand pipe, the nozzle can fall away from the pipe and spray gasoline on the automobile and the station's paving. Somewhat akin to this dangerous situation is the failure of an improperly inserted and unattended gasoline nozzle to terminate flow to a full tank. In this case fuel spills from the stand pipe to the paving. Even if fire is avoided in these situations, the gasoline, flowing over a portion of the vehicle's finish, usually will produce an undesirable discoloration.

A number of accessories have been devised through the years for the nozzle-fuel tank stand pipe connection. Illustratively, U.S. Pat. No. 2,170,415 granted Aug. 22, 1939 for a "Rain Shield For Filling Openings of Automobile Gasoline Tanks" shows an apparatus that prevents rain water from entering an automobile fuel tank.

U.S. Pat. No. 2,464,958 granted Mar. 22, 1949 for "Nozzle Holder" shows an apparatus for angularly orienting the nozzle of a water hose.

U.S. Pat. No. 3,389,486 granted June 25, 1968 to E. M. Trammell, Jr. for "Vehicle License Plate Holders" shows a device for mounting an automobile license plate in a manner that conceals the recess housing, the cap and fuel tank stand pipe.

U.S. Pat. No. 4,079,952 granted Mar. 21, 1978 to H. Nishio et al. for "Filler Assembly of an Automotive Fuel Tank" discloses an improved filler cap for an automobile fuel tank.

U.S. Pat. No. 4,257,642 granted Mar. 24, 1981 to J. S. Sampson for "Gasoline Fill Cover Holding Arm" shows a hinged device for retaining a spring biased automobile license plate holder in a horizontal position to expose a.fuel tank cap and stand pipe.

None of these U.S. patents, however, show or suggest any apparatus for unerringly guiding and sustaining a gas pump hose nozzle in proper orientation relative to a fuel tank stand pipe in order to avoid automobile body damage or gasoline spillage.

SUMMARY OF THE INVENTION

These and other inadequacies that have characterized automobile fuel tank stand pipe assemblies are overcome, in large measure, through the practice of the invention. Typically, a pair of laterally spaced flanges are mounted on the usually concealed surface of a license plate holder in parallel planes that are essentially perpendicular to the plane of the license plate holder. The flanges are so spaced that they accommodate the cap and stand pipe in the gap that is formed between them. The maximum height of these flanges, moreover, is sufficient to enable a gas pump nozzle to lean against one of the flanges without undergoing any further movement relative to the stand pipe. The flanges also enjoy respective arcuate circumferences that extend from the maximum height of each flange adjacent to the stand pipe to the plane of the license plate holder. Thus, when refueling is completed and the license plate holder is snapped back to cover the stand pipe recess, the arcuate flanges swing forward to rest within the body of the vehicle on opposite sides of the cap and stand pipe.

In this manner, the flanges guide the end of the nozzle into the open end of the stand pipe in correct relative orientation. The unattended nozzle, in turn, is sustained by the flanges in the proper relationship with respect to the stand pipe. The invention thereby protects the automobile from damage and prevents the nozzle from falling out of the stand pipe or permitting gasoline to pour from an overflowing tank.

Thus, there is provided, in accordance with the invention, an inexpensive and sturdy apparatus for guiding fuel pump nozzles into a stand pipe and supporting the discharge end of the nozzle in the stand pipe during refueling. For a more detailed appreciation of the invention, attention is invited to the following description of a preferred embodiment of the invention, taken with the drawing. The scope of the invention, however, is limited only through the claims appended hereto.

BRIEF DESCRIPTION OF THE DRAWING

The sole FIGURE of the drawing is a perspective view of a typical embodiment of the invention.

DETAILED DESCRIPTION OF A PREFERRED EMBODIMENT

For a greater understanding of the invention, attention is invited to the drawing which shows a rear end of an automobile 10 in which a cover or license plate holder 11 is snapped down into an horizontal position to expose a recess 12 that houses a fuel tank stand pipe 13 and a closure or cap 14.

As illustrated, the holder 11 exposes a flat surface 15 that is parallel and opposite to the side on which the license plate (not shown in the drawing) is mounted. In accordance with the invention, a pair of flanges 16,17 are spaced laterally from each other on opposite sides of the cap 14 by a distance that is sufficient to clear the cap and enable a gasoline pump hose nozzle (not shown) to be received in the gap that is formed between the flanges.

The flanges 16,17, as shown, are mounted on the holder 11, generally perpendicular to the holder's surface 15. Each of the flanges 16,17 moreover has a respective arcuate circumference 20,21 that sweeps from the maximum flange height above the surface 15, a height that is about equal to the vertical distance of the cap 14 above the surface 15, down to that surface.

A web 22 joins the flanges 16,17 together. The web extends across the mid-portion of the holder 11 and is parallel to the surface 15 to provide a means for fastening the flanges 16,17 and the web 22 to the holder 11 through rivets, or the like.

An aperture 23 is formed in the recess 12 in the immediate vicinity of the cap 14 and the stand pipe 13 to house the flanges 16,17 within the body of the automobile 10 as described subsequently in more complete detail.

In operation, the cap 14 is removed from the stand pipe 13. A nozzle (not shown in the drawing) is inserted in the direction of arrow 24 in order to seat properly within the now open end of the stand pipe. Thus, no matter how hastily the insertion may be accomplished, flanges 16,17 guide the nozzle in the correct direction and orientation to prevent the nozzle from damaging the finish or body of the automobile 10.

After manually setting a desirable automatic fill flow rate through the nozzle, the attendant can walk away from the automobile 10, secure in the knowledge that the nozzle will be sustained in the proper relationship with respect to the stand pipe 13 by leaning against one of the flanges 16,17.

After the tank (not shown) is filled to the desired level, the flow of fuel through the nozzle is terminated and the nozzle is withdrawn from the open stand pipe 13. The cap 14 is replaced and the holder 11 is snapped in the direction of arrow 25 to permit the holder to cover the recess 12. As the holder is pivoting in the direction of the arrow 25, the arcuate circumferences 20,21 of the flanges 16,17, respectively, clear the adjacent perimeter of the aperture 23 in order to nest within the body of the vehicle 10, each on a diametrically opposite side of the cap 14 and the stand pipe 13.

In the foregoing manner, flanges 16,17 not only protect the auto body from damage caused by a carelessly handled nozzle, but also prevent gasoline spillage from an improperly positioned nozzle.

I claim:

1. An access port with a hose nozzle holder for a liquid filler pipe of a vehicle comprising:
   a cover assembly disposed in a body of the vehicle at the site of the pipe, there being an aperture in said body providing access to said pipe, and wherein said cover assembly includes a cover pivotally mounted about an axis of pivot to said body for pivoting between an open position wherein said pipe is exposed and a closed position wherein said pipe is covered; and
   a nozzle holder for aligning a nozzle with the pipe, said nozzle holder comprising a flange assembly secured to said cover and having a pair of flanges upstanding from said cover for releasable engagement with the nozzle when said cover is in the open position, said flanges being oriented generally perpendicularly to said pivot axis and being spaced apart a sufficient distance from each other to pass via said aperture alongside said pipe when said cover is in the closed position, thereby providing for a stowage of the nozzle holder when said cover is pivoted to the closed position.

2. An access port with a hose nozzle holder according to claim 1 wherein said flange assembly further comprises a web parallel to a surface of the cover and fastened thereto, said web joining said flanges together and joining said flanges to the cover.

3. A cover according to claim 2 wherein the cover further comprises a license plate holder.

4. An access port with a hose nozzle holder according to claim 2 wherein said pair of flanges is mounted generally perpendicularly to the surface of the cover, said flanges being spaced from each other through a distance that is at least equal to the outside diameter of the pipe, said flanges having a maximum height that is approximately equal to the distance between the cover surface on which said flanges are mounted and the pipe, said flanges each having a respective arcuate circumference to enable said flanges to protrude into the aperture in the automobile body, each flange on a respective opposite side of the pipe to selectively support the fuel pump nozzle therebetween.

5. In a vehicle having a liquid filler pipe and an aperture in a body of the vehicle providing access to the pipe, and wherein the aperture is sufficiently large to provide a space between the edge of the aperture and the filler pipe, the vehicle including a cover assembly disposed in a body of the vehicle at the site of the pipe, the cover assembly including a cover pivotally mounted about an axis of pivot to said body for pivoting between an open position wherein said pipe is exposed and a closed position wherein said pipe is covered; an improvement comprising
   a hose nozzle holder for aligning a nozzle with the liquid filler pipe, the holder comprising: a flange assembly secured to said cover and having a pair of flanges upstanding from said cover for releasable engagement with the nozzle when said cover is in the open position, said flanges being oriented generally perpendicularly to said pivot axis and being spaced apart a sufficient distance from each other to pass via said aperture alongside said pipe when said cover is in the closed position, thereby providing for a stowage of the nozzle holder when said cover is pivoted to the closed position.

6. In a vehicle, an improvement according to claim 5 wherein said flange assembly further comprises a web parallel to a surface of the cover and fastened thereto, said web joining said flanges together and joining said flanges to the cover.

7. In a vehicle, an improvement according to claim 6 wherein the cover further comprises a license plate holder.

8. In a vehicle, an improvement according to claim 6 wherein said pair of flanges is mounted generally perpendicularly to the surface of the cover, said flanges being spaced from each other through a distance that is at least equal to the outside diameter of the pipe, said flanges having a maximum height that is approximately equal to the distance between the cover surface on which said flanges are mounted and the pipe, said flanges each having a respective arcuate circumference to enable said flanges to protrude into the aperture in the automobile body, each flange on a respective opposite side of the pipe to selectively support the fuel pump nozzle therebetween.

* * * * *